United States Patent [19]
Yamamoto et al.

[11] Patent Number: 6,063,859
[45] Date of Patent: May 16, 2000

[54] COATING COMPOSITION FOR GOLF BALL AND GOLF BALL USING THE SAME

[75] Inventors: Shuichi Yamamoto; Etsuji Akimaru; Shigeru Noguchi, all of Ohmiya; Takashi Ohira, Chichibu; Hiroto Sasaki, Chichibu; Susumu Muta, Chichibu, all of Japan

[73] Assignees: Cashew Co., Ltd., Saitama-ken; Bridgestone Sports Co., Ltd., Tokyo, both of Japan

[21] Appl. No.: 08/898,578

[22] Filed: Jul. 22, 1997

[30] Foreign Application Priority Data

Feb. 24, 1997 [JP] Japan ..................................... 9-055501

[51] Int. Cl.⁷ ................................ C08J 3/00; C08K 3/20; C08L 75/00; A63B 37/12
[52] U.S. Cl. .......................... 524/590; 473/351; 473/365; 524/539; 524/589; 524/591; 524/839; 524/840
[58] Field of Search ...................................... 524/539, 590, 524/589, 591, 839, 840; 473/351, 365

[56] References Cited

U.S. PATENT DOCUMENTS 5,126,393  6/1992  Blum et al. .............................. 524/538

FOREIGN PATENT DOCUMENTS 63-164966  7/1988  Japan .
8-206255  8/1996  Japan .

*Primary Examiner*—Patrick D. Niland
*Attorney, Agent, or Firm*—Browdy and Neimark

[57] ABSTRACT

A coating composition for a golf ball which comprises a non-yellowing polyisocyanate and a hydroxyl group-containing polyester obtained by reacting a polyhydric alcohol, at least a part of which has an alicyclic structure in the molecule, with a polybasic acid component, and a golf ball whose body is coated with the above coating composition. When said coating composition is used, a high durability is achieved even when a white enamel coating is omitted from the lower layer part of the coating and the coating step can be shortened.

4 Claims, No Drawings

COATING COMPOSITION FOR GOLF BALL AND GOLF BALL USING THE SAME

BACKGROUND OF THE INVENTION

1. Field of the Invention

This invention relates to a two-pack type coating composition for golf ball excellent in surface durability and to a golf ball using the same.

2. Description of Related Art

The surface layer of a golf ball has a double layer structure in which the lower layer portion is composed of a white enamel coating composition and the upper layer portion is composed of a clear coating composition. The role of this clear coating composition is to protect the ball body and retain its gloss and beautiful appearance.

This kind of coating composition is required to have such excellent impact resistance that the coating withstands the repeated hitting with a golf club and such excellent sand abrasion resistance that the coating with-stands the bunker shot, and also have excellent resistance to contamination with grass sap, excellent weather resistance and excellent water resistance.

Many coating compositions for a golf ball satisfying these properties are now two-pack type polyurethane coating compositions which are cured using a non-yellowing type isocyanate curing agent and a hydroxyl group-containing polyester resin obtained by reacting a polyhydric aliphatic alcohol with a polybasic aliphatic or aromatic acid.

In the case of the golf ball coated with the above-mentioned conventional polyurethane coating composition, the fracture strength of the clear layer of the surface coating film is not great and the elongation thereof is not sufficient, so that face mark flaw, craze, crack and the like tend to be caused by the hitting with a golf club. Moreover, the sand abrasion during the bunker shot and the contamination with grass sap during the shots in the fairway, the rough and the like are violent, so that the gloss and beautiful appearance of a golf ball are liable to be lost. In other words, the clear layer of the conventional polyurethane surface coating film lacks such a durability that the appearance and beautiful sight of a golf ball are retained.

The present inventors have fund that when a compound having an alicyclic structure in the molecule is substituted for at least a part of at least the polyhydric alcohol component in the hydroxyl group-containing polyester which is the main constituent of the above-mentioned polyurethane coating composition, the golf ball coated with the resulting polyurethane coating composition has a durability even when the conventional white enamel coating of the lower layer part is omitted, whereby the above-mentioned problems can be solved and the coating step can be shortened. By this finding, this invention has been completed.

SUMMARY OF THE INVENTION

According to this invention, there is provided a coating composition for a golf ball, which comprises a non-yellowing polyisocyanate and a hydroxyl group-containing polyester obtained by reacting a polyhydric alcohol component with a polybasic acid component, wherein at least a part of the above-mentioned polyhydric alcohol component has an alicyclic structure in the molecule.

According to this invention, there is further provided a coating composition for a golf ball which comprises a non-yellowing polyisocyanate and a hydroxyl group-containing polyester obtained by reacting a polyhydric alcohol component with a polybasic acid component, wherein at least a part of each of the above-mentioned polyhydric alcohol component and polybasic acid component has an alicyclic structure in the molecule.

According to this invention, there is still further provided a clear coating composition for a golf ball which comprises a non-yellowing polyisocyanate and a hydroxyl group-containing polyester obtained by reacting a polyhydric alcohol component with a polybasic acid component, wherein at least a part of the above-mentioned polyhydric alcohol component has an alicyclic structure in the molecule.

According to this invention, there is still further provided a clear coating composition for a golf ball which comprises a non-yellowing polyisocyanate and a hydroxyl group-containing polyester obtained by reacting a polyhydric alcohol component with a polybasic acid component, wherein at least a part of each of the above-mentioned polyhydric alcohol component and polybasic acid component has an alicyclic structure in the molecule.

There is furthermore provided a golf ball obtained by coating the body of the golf ball with any one of the above-mentioned coating compositions to form a coating film on its surface.

DETAILED DESCRIPTION OF THE INVENTION

The polyhydric alcohol component having an alicyclic structure in the molecule used in this invention is preferably a diol such as 1,3-cyclohexanedimethanol, 1,4-cyclohexanedimethanol or the like or a mixture of the diols.

The polybasic acid component having an alicyclic structure in the molecule used in this invention includes preferably such dicarboxylic acids as tetrahydrophthalic acid, hexahydrophthalic acid, 1,3-cyclohexanedicarboxylic acid and 1,4-cyclohexanedicarboxylic acid, anhydrides of these dicarboxylic acids, acid halides thereof and mixtures thereof.

In this invention, the above-mentioned polyhydric alcohol component having an alicyclic structure in the molecule and the above-mentioned polybasic acid component having an alicyclic structure in the molecule may be a part or the whole of the constituents of the hydroxyl group-containing polyester. The polyhydric alcohol component having an alicyclic structure in the molecule is contained preferably in a proportion of at least 3% by weight, more preferably 5 to 40% by weight, based on the total weight of the polyhydric alcohol components. The polybasic acid component having an alicyclic structure in the molecule is contained preferably in a proportion of at least 5% by weight, more preferably 10 to 55% by weight, based on the total weight of the polybasic acid components. When the content of the polyhydric alcohol component having an alicyclic structure in the molecule and the content of the polybasic acid component having an alicyclic structure in the molecule are outside the above-mentioned respective ranges, the durability of the coated golf ball against sand abrasion and contamination with grass sap become insufficient.

As a polyhydric alcohol having no alicyclic structure in the molecule which can be used in combination with the above-mentioned polyhydric alcohol having an alicyclic structure in the molecule, there are mentioned ethylene glycol, diethylene glycol, triethylene glycol, propylene glycol, dipropylene glycol, butylene glycol, 1,6-hexanediol, neopentyl glycol, 3,3-dimethylolheptane, polyethylene glycol, polypropylene glycol, glycerin, trimethylolethane, trimethylolpropane and pentaerythritol; mixtures of these; and the like.

As a polybasic acid component having no alicyclic structure in the molecule which can be used in combination with the above-mentioned polybasic acid component having an alicyclic structure in the molecule, there are mentioned such dicarboxylic acids as adipic acid, sebacic acid, dimeric acid, phthalic acid, isophthalic acid, terephthalic acid, maleic acid, fumaric acid, itaconic acid and the like; anhydrides of these dicarboxylic acids; acid halides thereof; and mixtures thereof.

The hydroxyl group-containing polyester is obtained by subjecting the above-mentioned polyhydric alcohol component and the above-mentioned polybasic acid component to esterification reaction.

The hydroxyl group-containing polyester thus obtained has preferably a weight average molecular weight of 3,000 to 35,000 as measured by GPC and has preferably a hydroxyl value of 50 to 300, particularly preferably 150 to 250. When the molecular weight and the hydroxyl value of the hydroxyl group-containing polyester are outside the above-mentioned respective ranges, the durability of the coated golf ball against sand abrasion and contamination with grass sap becomes insufficient.

As the non-yellowing polyisocyanate used in this invention, suitable are adducts, biurets and isocyanurates of, for example, hexamethylene diisocyanate, isophorone diisocyanate, hydrogenated xylylene diisocyanate and the like and mixtures thereof.

In this invention, the hydroxyl group-containing polyester and the non-yellowing polyisocyanate are preferably used in such a proportion that the mole ratio of the isocyanate group of the non-yellowing polyisocyanate to the hydroxyl group of the hydroxyl group-containing polyester (NCO/OH) is within the range of from 0.8 to 1.3.

In this invention, if necessary, a pigment, a fluorescent whitening agent, a curing catalyst, a leveling agent, an ultraviolet absorber or the like can be used alone or in admixture in combination with the above-mentioned essential components. Moreover, it is preferable to use a solvent to adjust the viscosity of the coating composition.

The coating composition for a golf ball of this invention is of a two-pack type, and a coating film can be formed by coating the coating composition on the surface of golf ball and then drying and curing the same at a temperature of, for example, 60° C. or less.

Of course, a coated golf ball may be produced by uniformly coating a golf ball with the coating composition of this invention having incorporated thereinto an additive such as a white pigment, a curing catalyst, a solvent or the like, drying and curing the coating composition, subsequently coating thereon the clear coating composition of this invention suitably diluted with a solvent and then drying and curing the clear coating composition; however, it is possible to achieve the object of this invention by coating a golf ball with only the clear coating composition of this invention.

The body of a golf ball to be used in this invention includes a three-piece golf ball and a solid golf ball such as a one-piece golf ball, a two-piece golf ball or the like.

When the coating composition for a golf ball of this invention is used, the conventional coating of the lower layer portion with a white enamel coating composition can be omitted. The golf ball coated with the coating composition of this invention has a high surface durability, and hence, when the coated golf ball is hit with a golf club, a face mark flaw, a crack, a crevice and the like are hardly caused on the surface of the coated golf ball. Moreover, the coated golf ball is excellent in resistance to sand abrasion during the bunker shot and resistance to contamination with grass sap during the shots in the fairway, the rough and the like. Therefore, the appearance and beautiful sight of the golf ball can be retained. Accordingly, the coating composition for a golf ball of this invention can bring about an economical effect due to the shortening of the coating step, and simultaneously can give a highly durable golf ball which can keep its gloss and beautiful sight for a long period of time.

DESCRIPTION OF THE PREFERRED EMBODIMENTS

Examples are shown below to explain this invention in more detail.

EXAMPLE 1

Synthesis of Hydroxyl Group-Containing Polyester Composition 1,3-Cyclohexanedicarboxylic acid 138.0 parts by weight
Adipic acid 157.0 parts by weight
Trimethylolpropane 140.0 parts by weight
Neopentyl glycol 65.0 parts by weight
1,4-Cyclohexanedimethanol 58.0 parts by weight
Diethylene glycol 30.0 parts by weight The above components were mixed and then heated at 200–240° C. for 5 hours to obtain a polyester having an acid value of 4, a hydroxyl value of 170 and a weight average molecular weight of 15,000.

The polyester thus synthesized was dissolved in a mixed solvent of xylene/methyl isobutyl ketone (MIBK)=1/1 (weight ratio) to prepare a varnish having a nonvolatile content of 70% by weight. This is referred to hereinafter as Varnish 1.

Preparation of Coating Composition

In the proportions shown in Table 1, Varnish 1, an adduct of hexamethylene diisocyanate (Takenate D-160N manufactured by Takeda Chemical Industries, Ltd., NCO content: 8.5% by weight, solid content: 50% by weight) as an unblocked non-yellowing polyisocyanate, dibutyltin dilaurate as a curing catalyst and butyl acetate/MIBK/propylene glycol monomethyl ether acetate (PMA)=2/3/5 (weight ratio) as a solvent were blended to prepare a coating composition.

Coating of Golf Ball

A two-piece ball after mark-stamp was coated with the above-mentioned coating composition using an automatic spray gun so that the thickness of the coating film became 15 μm. The coated golf ball was dried at 60° C. for 2 hours and then at room temperature for 16 hours to obtain a test sample.

Performance Test (1) Sand Abrasion Resistance Test

In a 8-liter porcelain-made ball mill were placed 10 golf balls and 3 liters of bunker sand, and they were mixed for 2 hours, after which the degree of flow of the surface due to sand abrasion, the degree of reduction of gloss and the degree of sand attachment were checked visually. The results thereof are shown in Table 1.

(2) Test of Resistance to Contamination with Grass Sap

In a 8-liter porcelain-made ball mill was placed a mixture obtained by previously mixing 500 g of the green leaf portion of spinach with 500 g of water, and therein were then placed 10 coated golf balls, after which they were mixed for 3 hours. The degree of greenness of the golf ball was measured using a color difference meter to determine the color difference ΔE. The results obtained are shown in Table 1.

EXAMPLE 2

Synthesis of Hydroxyl Group-Containing Polyester Composition
Adipic acid 234.0 parts by weight
Phthalic anhydride 60.0 parts by weight
Trimethylolpropane 150.0 parts by weight
Neopentyl glycol 42.0 parts by weight
1,3-Cyclohexanedimethanol 115.0 parts by weight In the same manner as in Example 1, the above components were treated to obtain a polyester having an acid value of 5, a hydroxyl value of 190 and a weight average molecular weight of 12,000. The polyester thus synthesized was dissolved in a mixed solvent of xylene/MIBK=1/1 (weight ratio) to prepare a varnish having a nonvolatile content of 70% by weight. This varnish is referred to hereinafter as Varnish 2.

Preparation of Coating Composition

In the proportions shown in Table 1, an adduct of hexamethylene diisocyanate (Takenate D-160N manufactured by Takeda Chemical Industries, Inc., NCO content: 8.5% by weight, solid content: 50% by weight) as a non-yellowing polyisocyanate, dibutyltin dilaurate as a curing catalyst, and butyl acetate/MIBK/PMA=2/3/5 (weight ratio) as a solvent were blended to prepare a coating composition.

Coating of Golf Ball and Performance Test

In the same manner as in Example 1, a two-piece golf ball was coated with the above-mentioned coating composition and then the coated golf ball was subjected to performance test.

The results obtained are shown in Table 1.

COMPARATIVE EXAMPLE 1

Synthesis of Hydroxyl Group-Containing Polyester Composition
Isophthalic acid 138.0 parts by weight
Adipic acid 157.0 parts by weight
Trimethylolpropane 140.0 parts by weight
Neopentyl glycol 65.0 parts by weight
Dipropylene glycol 58.0 parts by weight
Diethylene glycol 30.0 parts by weight In the same manner as in Example 1, the above components were treated to obtain a polyester having an acid value of 4, a hydroxyl value of 170 and a weight average molecular weight of 15,000. This polyester thus synthesized was dissolved in a mixed solvent of xylene/MIBK=1/1 (weight ratio) to prepare a varnish having a nonvolatile content of 70% by weight. This varnish is referred to hereinafter as Varnish 3.

Preparation of Coating Composition

In the proportions shown in Table 1, Varnish 3, an adduct of hexamethylene diisocyanate (Takenate D-160N manufactured by Takeda Chemical Industries, Ltd., NCO content: 8.5% by weight, solid content: 50% by weight) as a non-yellowing polyisocyanate, dibutyltin dilaurate as a curing catalyst and a mixed solvent of butyl acetate/MIBK/PMA= 2/3/5 (weight ratio) as a solvent were blended to prepare a coating composition.

Coating of Golf Ball and Performance Test

In the same manner as in Example 1, a two-piece golf ball was coated with the above coating composition and the coated golf ball was subjected to performance test.

The results obtained are shown in Table 1.

COMPARATIVE EXAMPLE 2

Synthesis of Hydroxyl Group-Containing Polyester Composition
Adipic acid 234.0 parts by weight
Tetrahydrophthalic anhydride 60.0 parts by weight
Trimethylolpropane 150.0 parts by weight
Neopentyl glycol 42.0 parts by weight
Dipropylene glycol 115.0 parts by weight In the same manner as in Example 1, the above components were treated to obtain a polyester having an acid value of 5, a hydroxyl value of 190 and a weight average molecular weight of 12,000. The polyester thus synthesized was dissolved in a mixed solvent of xylene/MIBK=1/1 (weight ratio) to prepare a varnish having a nonvolatile content of 70% by weight. This varnish is referred to hereinafter as Varnish 4.

Preparation of Coating Composition

In the proportions shown in Table 1, Varnish 4, an adduct of hexamethylene diisocyanate (Takenate D-160N manufactured by Takeda Chemical Industries, Ltd., NCO content: 8.5% by weight, solid content: 50% by weight) as a non-yellowing polyisocyanate, dibutyltin dilaurate as a curing catalyst and a mixed solvent of butyl acetate/MIBK/PMA= 2/3/5 (weight ratio) as a solvent were blended to prepare a coating composition.

Coating of Golf Ball and Performance Test

In the same manner as in Example 1, a two-piece golf ball was coated with the above coating composition and the coated golf ball was subjected to performance test.

The results obtained are shown in Table 1.

TABLE 1

|  | Ex. 1 | Ex. 2 | Comp. Ex. 1 | Comp. Ex. 2 |
|---|---|---|---|---|
| Coating composition (part by wt.) | | | | |
| Hydroxyl-containing polyester | | | | |
| Varnish 1 | 100 | | | |
| Varnish 2 | | 100 | | |
| Varnish 3 | | | 100 | |
| Varnish 4 | | | | 100 |
| Non-yellowing polyisocyanate | 75 | 85 | 75 | 85 |
| Curing catalyst | 0.005 | 0.005 | 0.005 | 0.005 |
| Solvent | 250 | 250 | 250 | 250 |
| Performance | | | | |
| Degree of flaw | Low | Low | High | High |
| Degree of reduction of gloss | Very low | Very low | Low | Low |
| Degree of attachment of sand | Low | Low | Difficult to remove | High |
| Contamination with grass sap (ΔE) | 5.0 | 4.0 | 10.0 | 7.0 |

What is claimed is:

1. A coating composition for a golf ball, which comprises a non-yellowing polyisocyanate and a hydroxyl group-containing polyester obtained by reacting a polyhydric alcohol component, at least a part of which has an alicyclic structure in the molecule, with a polybasic acid, wherein the polyhydric alcohol component is composed of only the polyhydric alcohol having an alicyclic structure in the molecule.

2. A coating composition for a golf ball, which comprises a non-yellowing polyisocyanate and a hydroxyl group-containing polyester obtained by reacting a polyhydric alcohol component, at least a part of which has an alicyclic structure in the molecule, with a polybasic acid component, at least a part of which has an alicyclic structure in the molecule, wherein the polyhydric alcohol component is composed of only the polyhydric alcohol having an alicyclic structure in the molecule and the polybasic acid component is composed of only the polybasic acid having an alicyclic structure in the molecule.

3. A golf ball obtained by coating the body of a golf ball with a coating composition to form a coating film, said coating composition comprising a non-yellowing polyisocyanate and a hydroxyl group-containing polyester obtained by reacting a polyhydric alcohol component, at least a part of which has an alicyclic structure in the molecule, with a polybasic acid.

4. A two-pack clear coating composition for a golf ball, which comprises a first pack of a non-yellowing polyisocyanate and a second pack of a hydroxyl group-containing polyester obtained by reacting components consisting essentially of (1) a polyhydric alcohol component, at least a part of which has an alicyclic structure in the molecule, and (2) a polybasic acid component, at least a part of which has an alicyclic structure in the molecule, said composition being curable at a temperature of about 60° C. or less when said first and second packs are mixed together.

* * * * *